Jan. 2, 1945.  P. J. GAYLOR  2,366,514
MODIFIED PLASTIC
Filed Jan. 20, 1942
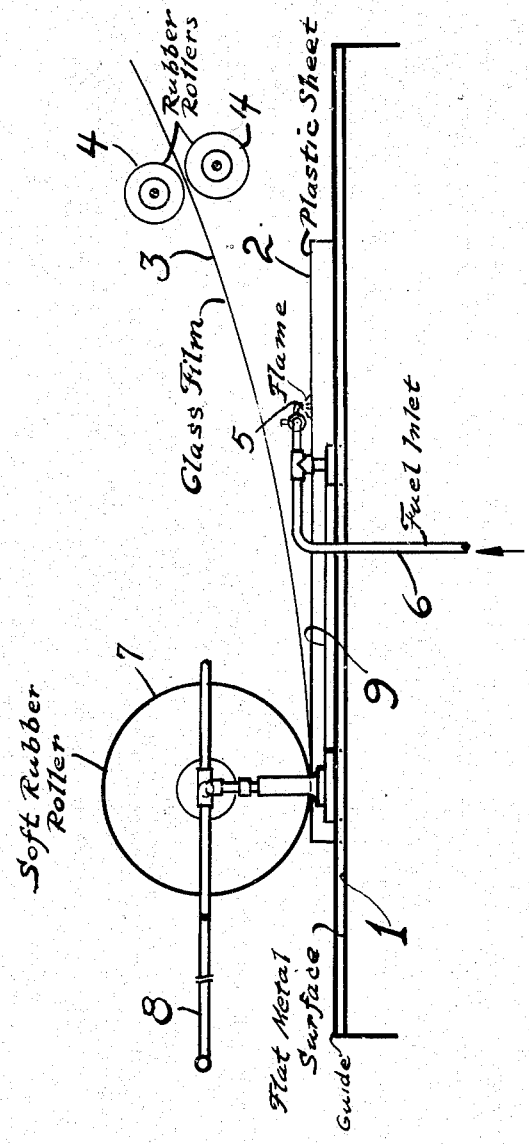
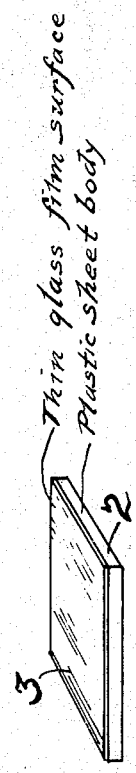
Peter J. Gaylor Inventor
By P. L. Young Attorney Patented Jan. 2, 1945

2,366,514

UNITED STATES PATENT OFFICE 2,366,514

MODIFIED PLASTIC

Peter J. Gaylor, Union, N. J., assignor to Standard Oil Development Company, a corporation of Delaware Application January 20, 1942, Serial No. 427,458

4 Claims. (Cl. 18—59)

This invention deals with the production of modified plastics by coating them with a very thin film of glass.

Glass possesses a number of unusual desirable properties not enjoyed by other plastics. It is hard, difficult to scuff or scratch, and is chemically inert towards most reagents. Unfortunately, however, it shatters very readily due to its extreme brittleness, and for this reason it is still classed as an extremely perishable material. Furthermore, in the forms generally used, glass is not very flexible.

Organic plastics, on the other hand, are quite flexible in thick sheets and are not subject to shattering since they usually are not brittle. However, they do possess the property of ready scuffing or scratching because of their relative softness, and they are also subject to deterioration by oxidation, light, and numerous chemical reagents.

The shattering power of glass has, to some extent, been overcome in the prior art by sandwiching alternate layers of thin sheets of plastic between thick sheets of glass. "Bullet-proof" glass has been made in this manner, but such a technique has not resulted in any improvement in molded plastic products or flexible sheets, and large glass windows, prepared in this manner, still collapse due to the large proportion of fragile glass present and the high density of the compositions.

The present invention deals with the production of light weight extremely flexible compositions capable of numerous useful adaptations. It essentially comprises coating of the surface of a relatively thick piece of organic plastic with an extremely thin sheet of an inorganic plastic such as glass or similar metal silicates.

When present in thick sheets, say of about over 0.01" thickness, glass is a very fragile, brittle and inflexible material. But, when drawn out in thin sheets of less than 0.01" or even less than 0.001", glass is quite flexible and can be twisted cold in the shape of tubes of fairly small diameter without fracturing. Such films are still very fragile and brittle, and a hole may be readily poked through the surface with the slightest amount of effort. However, when these films are supported uniformly by a relatively thick, solid, somewhat flexible organic plastic backing, they approach more nearly a sort of monolithic structure, and lose most of their fragile propensities. In this form, such compositions offer a number of advantages over plastics produced in the present art, and serve new and useful purposes. It is possible, for example, to prepare plastic window shades made of a relatively thick sheet of plastic such as plasticized polyvinyl chloride or vinyl chloride-acetate copolymer coated on either side with a very thin sheet of glass, cemented evenly on the surface thereof which, for all practical purposes, might be called "flexible glass" shades since they are not affected by light or the atmosphere, and may be cleaned by wiping the glass surfaces with a moist cloth. Furthermore, such shades are more durable because the glass layer prevents continuous volatilization of the plasticizer which is usually the cause of gradual embrittlement of such plastics on aging.

Glass pipes employed in industry are limited as to uses mainly because they are readily broken. By means of the present invention, it is possible to produce flexible pipes serving the same purpose. A pipe constructed of plastic is merely coated on the inside (or outside if desired) with a very thin flexible sheet of glass. This sheet is preferably applied after the surface of the plastic pipe is coated with a cement. The glass sheet is then smoothed over the cemented surface so that a solid backing is obtained. A suitable cement for this purpose may be a lower molecular weight polymer of the plastic from which the body of the pipe is manufactured, or it may be a polyisobutene polymer, alkyl and/or aryl silicone polymers, low molecular weight polystyrene, polyacrylate or methacrylate, polyvinyl acetals, and the like.

Molded plastic products may be coated with a thin glass sheet in the same manner, thereby obtaining a glossy, fireproof, scratchproof surface which protects the plastic from light and oxidation. The glass may be colored so as to eliminate the necessity of coloring the plastic. Furthermore, the color will not fade or change in hue as in the case of the usual plastic colors. Optical lenses may be treated in a like manner, since the main difficulties with plastic lenses now are their scratching and scuffing properties. Window glass may also be made in the same manner, and such windows are more permanent and more difficult to break into. Venetian blinds and similar objects may be prepared in a like manner.

Plastics which may be treated in this manner are any of the polymer or resin or even rubber products such as phenol formaldehyde, methacrylate, acrylate, styrene, urea-aldehyde, vinyl chloride-acetate, polyacetate vinylidene chloride, "nylon" type acid amide, ethylene, unsaturated ketone and/or ether, diolefin, iso-olefin and other polymeric substances and copolymers thereof. The glass film may be attached to the surface by melting the surface by a flame or other means and applying the glass film with a roller or press. Difference in coefficient of expansion due to change in temperature may be allowed for by selecting the proper intermediate cementing compound. The term "organic plastic" as employed herein signifies the numerous plastic products of high molecular weight which contain carbon in their molecular structure. The term "inorganic plastic" signifies the metal silicates generally termed as "glasses" in inorganic chemistry, these being devoid of carbon in their molecular structure.

A translucent effect can be obtained by matting thin glass fibers upon a cementing surface of a plastic, although, as might be expected, a large part of the plastic surface is still exposed, and hence this method is not as effective in protecting the surface of the plastic as the other methods employing a continuous thin flexible form of glass.

Referring to the accompanying drawing, Fig. I is a diagrammatic representation of one mode of carrying out the present invention; Fig. II shows one type of finished product made according to the present invention. In the drawing, numeral 1 indicates a flat metal surface such as a flat steel table, upon which is placed a sheet of plastic material, as for example, polystyrene, polymethacrylate, vinylidene chloride copolymer, etc. Numeral 3 represents a previously prepared thin film of glass fed to the table by soft rubber rollers 4. The plastic is heated by flame 5, the fuel for which is supplied through line 6. Heating of the plastic surface by this means is carried out only to an extent sufficient to soften the surface of the plastic sheet upon which is impressed the heated glass film by soft rubber, asbestos or other type roller 7 which is moved along the table guide by a forward movement of the arm 8. The movements of burner 5 and roller 7 are synchronized by the connecting arm 9. By this means a firmly adherent glass film coated plastic sheet is obtained.

I claim:

1. A composition of matter comprising a relatively thick cross-section of solid organic plastic, and a relatively thin flexible film of glass cemented on at least a portion of the exposed plastic, thereby protecting the exposed surface of the plastic.

2. A composition of matter comprising a molded object of solid organic plastic, the exposed surface of which is at least partially coated with a firmly adhering flexible film of solid inorganic plastic of greater hardness than the organic plastic.

3. A composition of matter comprising a flexible solid organic plastic of relatively thick cross-section, the exposed surface of which is at least partially coated with an adherent thin flexible film of glass.

4. A method of producing modified plastics comprising producing an object of organic plastic of relatively thick cross-section, applying to at least a portion of the exposed surface thereof a thin firmly adherent flexible film of glass and applying a slight pressure to the outer surface of the film to insure satisfactory adhesion.

PETER J. GAYLOR.